No. 812,341. PATENTED FEB. 13, 1906.
J. W. HIRD.
FASTENING DEVICE FOR VEHICLE END GATES.
APPLICATION FILED APR. 3, 1905.

Witnesses
Jas. A. Kachl
C. H. Griesbauer

Inventor
J. W. Hird
by H. B. Wilson
Attorney

UNITED STATES PATENT OFFICE.

JAMES W. HIRD, OF BENTON, WISCONSIN.

FASTENING DEVICE FOR VEHICLE END-GATES.

No. 812,341.  Specification of Letters Patent.  Patented Feb. 13, 1906.

Application filed April 3, 1905. Serial No. 253,715.

*To all whom it may concern:*

Be it known that I, JAMES W. HIRD, a citizen of the United States, residing at Benton, in the county of Lafayette and State of Wisconsin, have invented certain new and useful Improvements in Fastening Devices for Vehicle End-Gates; and I do declare the following to be a full, clear, and exact description of the invention, such as will enable others skilled in the art to which it appertains to make and use the same.

This invention relates to improvements in fastening devices for vehicle end-gates.

The object of the invention is to provide a device of this character whereby the end-gates of vehicles may be quickly secured and held in a closed position and by which the same may be quickly released to permit them to be lowered.

With the above and other objects in view the invention consists of certain novel features of construction, combination, and arrangement of parts, as will be more fully described, and particularly pointed out in the appended claims.

Figure 1:
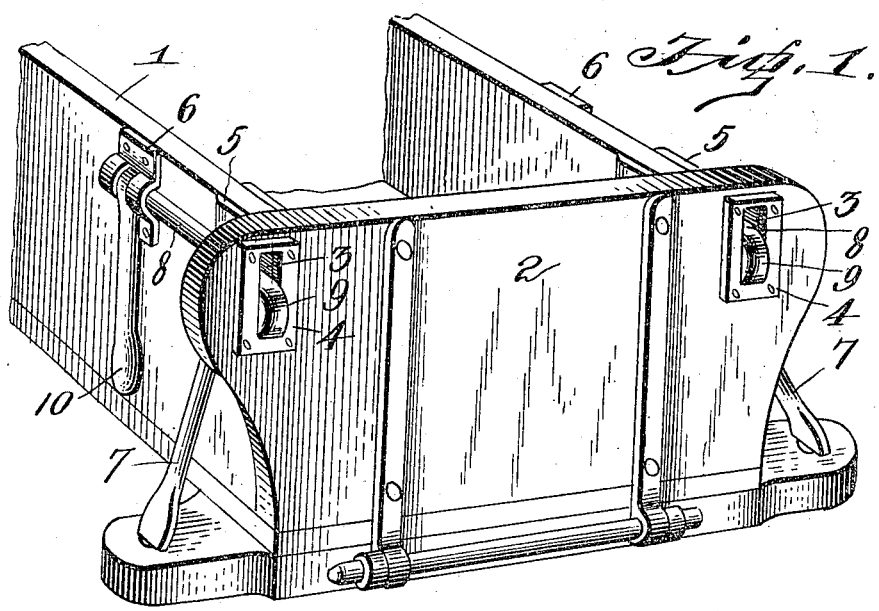
Figure 2:
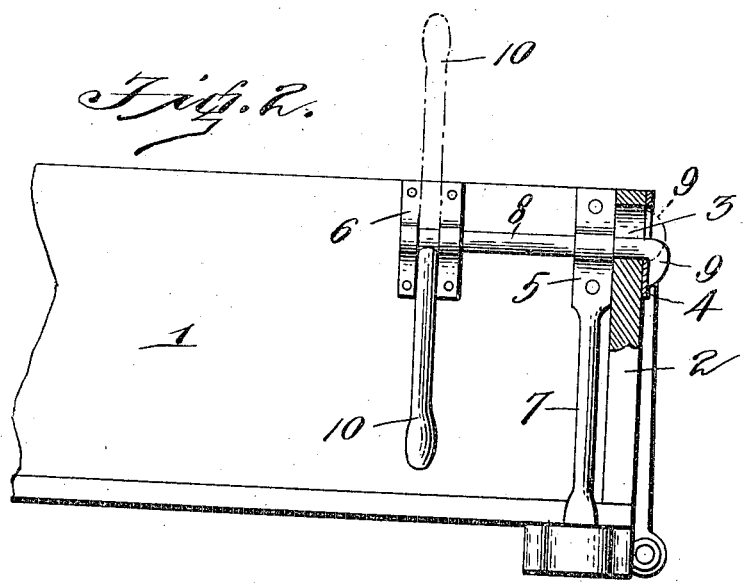

In the accompanying drawings, Figure 1 is a perspective view of the rear end of the wagon-body and end-gate, showing the application of the invention; and Fig. 2 is a side view of the same, partly in section, showing in full lines the device in locked position and in dotted lines the released position of the same.

Referring more particularly to the drawings, 1 denotes the wagon-body, on the outer end of which is hinged in any suitable manner an end or tail gate 2. In the end-gate 2, near the upper edge of the same and adjacent to the outer side of the wagon-body, is formed an elongated aperture 3, over which and secured to the outer side of the end-gate are secured wear-plates 4. On the sides of the wagon-body are secured bearing-brackets 5 and 6. The bracket 5 is preferably formed by a continuation of the rear wagon-body brace 7. The inner bracket 6 is preferably bifurcated, as shown. In the brackets 5 and 6 is revolubly mounted the bolt 8, said bolt being provided on its outer end with an offset head or lug 9, which when the same is turned upwardly is adapted to project through the aperture 3 in the end-gate 2 when the same is swung upwardly to a closed position, after which the bolts are revolved to turn the head 9 downwardly and into engagement with the wear-plate which surrounds the apertures 3, thereby securing said gate in a closed position. In order that the bolt 8 may be turned in the bearing-brackets 5 and 6, the former are provided with integral right-angularly-projecting operating-levers 10, said levers being preferably disposed and adapted to work in the bifurcated bearing-bracket 6, thereby holding the bolts 8 against longitudinal movement in the brackets. When the bolts 8 are turned to a locking position, the levers 10 will project downward and lie in close engagement with the sides of the wagon-body.

An end-gate fastening constructed as herein shown and described will be found to be simple, strong, and durable in construction, efficient in use, and may be readily operated to lock or release the end-gate of the wagon or other vehicle to which they may be attached.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described fastening for vehicle end-gates, consisting of an end-gate hinged at its lower end and enlarged at its upper end, said end-gate having apertures at opposite sides near its upper end, a bolt mounted to revolve in keepers upon each side of the vehicle-body, said bolts each having a laterally-projecting head formed on its outer end and adapted to pass through the apertures in the end-gate when turned in one position, and a lever secured to the ends of each of said bolts for rotating the same and turning the laterally-projecting head to the position to lock the end-gate against said head, substantially as described.

In testimony whereof I have hereunto set my hand in presence of two subscribing witnesses.

JAMES W. HIRD.

Witnesses:
W. B. VAIL,
J. E. OTIS.